United States Patent
Lui et al.

(10) Patent No.: US 9,959,439 B1
(45) Date of Patent: May 1, 2018

(54) ACTIVATING A RADIO FREQUENCY IDENTIFICATION (RFID) READER TO READ AN RFID TAG

(71) Applicant: Amazon Technologies, Inc., Seattle, WA (US)

(72) Inventors: Tak Keung Joseph Lui, Bellevue, WA (US); Alton Paul Werronen, Wauconda, IL (US); Maju Cheruvallil Kuruvilla, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 141 days.

(21) Appl. No.: 15/191,388

(22) Filed: Jun. 23, 2016

(51) Int. Cl.
  *G06K 7/10* (2006.01)
  *G06K 19/077* (2006.01)
  *G07C 9/00* (2006.01)
  *G06K 19/073* (2006.01)

(52) U.S. Cl.
  CPC ..... *G06K 7/10366* (2013.01); *G06K 7/10099* (2013.01); *G06K 19/07345* (2013.01); *G06K 19/07758* (2013.01); *G07C 9/00111* (2013.01)

(58) Field of Classification Search
  CPC ........... G06K 7/10366; G06K 7/10099; G06K 19/07345; G06K 19/07758; G07C 9/00111
  See application file for complete search history.

(56) References Cited

U.S. PATENT DOCUMENTS

| 6,150,948 A * | 11/2000 | Watkins | G06K 7/0008 340/5.64 |
| 2005/0073406 A1* | 4/2005 | Easley | G06Q 10/08 340/539.1 |
| 2017/0140181 A1* | 5/2017 | Reynolds | G06K 7/10297 |

OTHER PUBLICATIONS

RFGS Pro: Track and Trace Systems. Product Information. SICK AG, Feb. 18, 2014 (16 pages).

* cited by examiner

*Primary Examiner* — Nabil Syed
(74) *Attorney, Agent, or Firm* — Kilpatrick Townsend & Stockton LLP (57) ABSTRACT

Techniques for tracking a location of an item retainer are described. In an example, a computer system may receive one or more signals from one or more devices. At least one device may be located at a distance from a radio frequency identification (RFID) reader. The RFID reader may be located at a space opening and may cover a read zone around the space opening. The signal(s) may indicate that a condition to activate the RFID reader is met. This condition may be associated with a state of the space opening or a proximity of an item retainer to the read zone. The computer system may activate the RFID reader based on the condition being met and may determine a progress of the item retainer through the space opening based on whether an RFID tag was read by the RFID reader while the RFID reader was activated.

20 Claims, 6 Drawing Sheets

ACTIVATING A RADIO FREQUENCY IDENTIFICATION (RFID) READER TO READ AN RFID TAG

BACKGROUND

Radio frequency identification (RFID) technology has been adopted in many industries for different applications. For example, RFID technology is deployed to track locations of items in an operational environment. In particular, an RFID tag is attached to an item retainer that retains the items. An RFID reader is operated to read the RFID tag. Based on reading the RFID tag, a determination is made that the item retainer is located in proximity to the RFID reader.

In many operational environments, the RFID reader may read multiple RFID tags within a read cycle. Some of the RFID tags may be intended to be read by the RFID reader to facilitate location tracking. However, reading the remaining RFID tags may not be intended and may, in certain situations, result in false or incorrect location tracking. For example, a particular RFID reader may cross-read an RFID tag of an item retainer progressing through an adjacent read zone of another RFID reader. Because of the cross-read, the item retainer may be mistakenly identified as progressing through the read zone of the particular RFID reader.

Different reasons may exist for the unintentional RFID reads. These reasons include, for example, radio frequency (RF) reflections and obstructions from objects, orientation of an RFID tag relative to an RFID reader, and/or proximity of two RFID readers and relative location of an RFID tag to these readers. While post-processing of RFID read events may increase the accuracy of location tracking, such accuracy may be additionally or alternatively increased by reducing the likelihood and/or frequency of unintentional RFID reads.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to improving accuracy of tracking a location of an item retainer. The location may be tracked based on one or more RFID reads of an RFID tag associated with the item retainer. The accuracy may be improved by reducing the likelihood and/or frequency of unintentional RFID reads. For example, the RFID tag may be attached with the item retainer. The item retainer may be progressing through a space opening, such as a door, a window, or some other aperture within a space. An RFID reader may be located in proximity of the space opening and may cover a read zone that may include the space opening. One or more electronic devices, such as sensors or switches, may detect one or more conditions to activate the RFID reader. When the condition(s) is (are) met, the RFID reader may be activated for a time period. Within that time period, the RFID reader may perform a number of read cycles and, as applicable, read the RFID tag. The conditions may relate to the space opening (e.g., whether a door is open or closed) and/or proximity of the item retainer to the RFID reader and/or the space opening (e.g., whether the item retainer may be moving towards the RFID reader). Accordingly, one or more read events may be generated and analyzed to track the location of the item retainer. By tracking the location over time (e.g., based on RFID reads from different RFID readers and/or from the same RFID reader), the progress of the item retainer may also be tracked over time. The activation condition(s) being met may indicate an acceptable likelihood (e.g., a likelihood exceeding a threshold) of the item retainer progressing through the read zone of the RFID reader. Hence, by conditioning the activation of the RFID reader to this likelihood, the likelihood and/or frequency of unintentional RFID reads may be reduced and, thereby, the accuracy of tracking the location of the item may be improved.

To illustrate, consider an example of a storage facility. A pallet, or some other type of an item retainer, may retain a number of items to be moved from the storage facility to a delivery vehicle. An RFID tag may be attached to the pallet and may include a unique identifier of the pallet. An RFID reader may be located at an outbound door of the storage facility. The RFID reader may be turned on, but may be in an idle state (e.g., not performing RFID reads) until activation. A read of the RFID tag by the RFID reader may indicate an exit of the pallet from the storage facility through the outbound door. The activation of the RFID reader may be conditioned on the outbound door being open and the pallet being in proximity to and/or moving towards the outbound door. To enable this activation, a door sensor may be located at the outbound door and photoelectric sensors may be located proximate to the RFID reader along a path that the pallet would follow to reach the outbound door. The door sensor may detect a status of the door, such as a door open or a door shut. In comparison, the photoelectric sensors may detect a motion of the pallet and a direction of the motion. Thus, as the pallet is about to exit the storage facility through the outbound door, the different sensors may generate signals indicative of the conditions being met. Accordingly, the RFID reader may be activated and may read the RFID tag. The RFID read may identify the pallet. A log may be updated, where the log may track the progress of the pallet through the storage facility, and where the update may identify that the pallet exited through the outbound door.

By conditioning the activation of the RFID reader, the risk of cross-reads may be reduced. In particular, an RFID reader located at an adjacent outbound door may not be activated. Thus, that RFID reader may not cross-read the RFID tag. Risk of other RFID read inaccuracies may be similarly reduced. By reducing the likelihood and/or frequency of unintended RFID reads, computer functionality of a back-end system may be improved, where the back-end system may be configured to analyze RFID reads and control certain operations within the operational environment. For example, a lower number of RFID reads may be analyzed, thereby saving processing power and memory storage of the back-end system. In addition, the lower number of RFID reads may reduce usage of bandwidth of a data communication network connecting the back-end system with the RFID readers.

Tracking the progress of the pallet, and more generally of an item retainer, may include tracking the location of the pallet relative to an outbound door or an RFID reader as explained above. This tracking may also include a number of other functionalities. These functionalities may be associated with the same pallet or with other pallets. For instance, tracking the progress may include determining whether the pallet is exiting through the expected outbound door, whether the pallet retains the expected items, whether another pallet or another RFID tag in proximity to the outbound door has become stationary, and/or performance of a carrier of the pallet and/or of an operator of the carrier. These and other functionalities are further described in connection with the next figures.

In the interest of clarity of explanation, the embodiments of the present disclosure are described in connection with a pallet exiting a storage facility through an outbound door. However, the embodiments are not limited as such. Instead, the embodiments may similarly apply to any type of an item retainer that may be progressing through a space opening of a space. Generally, an item retainer may represent a retainer, such as an enclosure or a surface, for retaining one or more items. An example of an item retainer may include a package that contains a single item. Another example of an item retainer may include a pallet that holds multiple items. In certain situations, an item retainer may be the item itself. For instance, if the item is moved within the space without an additional retaining mechanism, the item retainer may include the surface of the item used to move the item. Similarly, a space may generally include any volume, bounded or unbounded, that may contain one or more item retainers and through which such item retainer(s) may progress. A storage facility, a warehouse, a sortation facility, a store, and a retail space may be example of the space. A space opening may represent an opening or passageway through a body (e.g., a wall, a boundary, a fence) located within the space. Example space openings may include doors, windows, gates, barriers and apertures. An item retainer may be progressing within the space in any direction, including an outbound direction, inbound direction, and within various sections of the space.

Figure 1:
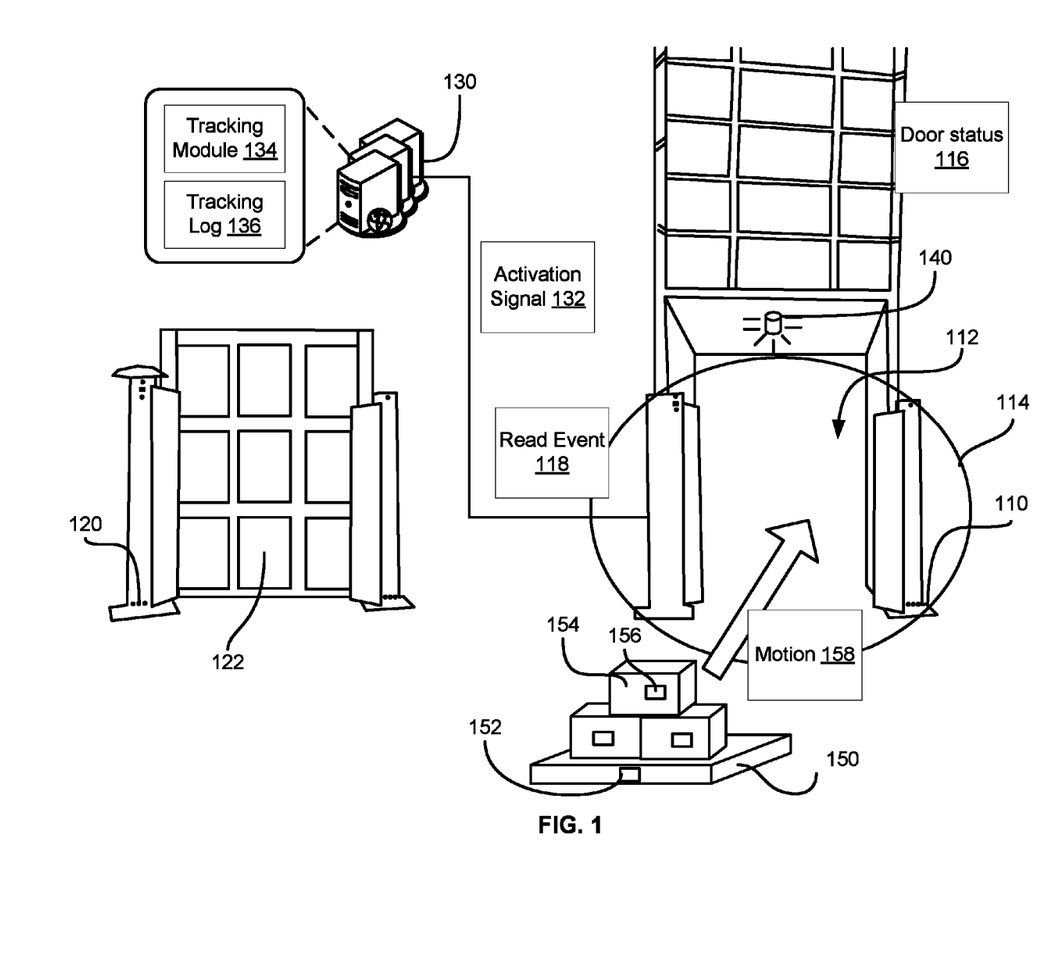
FIG. 1 illustrates an example operational environment for tracking an item retainer, according to an embodiment of the present disclosure.

FIG. 1 illustrates an example operational environment for tracking an item retainer. Generally, the operational environment may include a number of RFID readers in communication with a back-end system. Each RFID reader may be located within a known location of the operational environment and cover a zone around the known location. An RFID tag may be attached with an item retainer. The item retainer may be moved between zones covered by the RFID readers. Generally, as the item retainer moves into and within a read zone, the back-end system may activate the RFID reader responsible for that read zone, while retaining other RFID readers (e.g., ones adjacent to the activated RFID reader) in an idle state. The activated RFID reader may read the RFID tag during various read cycles. Once the item retainer leaves the read zone, the RFID reader may no longer read the RFID tag and may re-enter the idle state. By activating particular RFID readers, the risk of unintended RFID reads may be mitigated.

As illustrated, the operational environment may include a number of RFID readers distributed at different locations of a storage facility. For example, a first RFID reader 110 may be located at an outbound door 112 of the storage facility. The RFID reader 110 may cover a read zone 114. Another RFID reader 120 may be located at an adjacent outbound door 122. Because of the proximity between the two RFID readers 120 and a number of other factors (e.g., RF reflections and/or obstructions from objects, potential overlap between read zones, and other RFID read-related factors), cross-reads may occur.

The operational environment may also include a back-end system 130. The back-end system 130 may be communicatively coupled with the RFID readers over a wireless and/or wired public and/or private data communication network. The back-end system 130 may also be communicatively coupled with a number of other electronic devices (not shown in FIG. 1) over the same data communication network and/or a different network. These electronic devices may include sensors, switches, and/or other electronic devices for capturing data about conditions that may be related to door, RFID reader, and/or pallets. The back-end system 130 may receive signals from these devices, analyze the captured data, and determine which RFID reader to activate. Accordingly, the back-end system 130 may send an activation signal to a particular RFID reader over the data communication network. The RFID reader may receive the activation signal and switch from an idle state to an activated state for a period of time. While in the activated state, the RFID reader may perform a number of RFID reads according to a read cycle.

In addition, the back-end system 130 may receive, as applicable, RFID read events from the activated RFID reader over the data communication network. An RFID read event may represent an RFID read performed by the RFID reader during the read cycle. The RFID read event may include, for example, data associated with the RFID read, such as an identifier of an RFID tag, a unique identifier of a pallet corresponding to the RFID tag (or of an item if the RFID tag is attached to an item instead), RF signal strength, timing information, and other RFID read-related parameters. The back-end system 130 may analyze the RFID read events (or lack thereof) to determine a progress of the respective pallet(s).

In an example, the back-end system 130 may be a server or any other computer system suitable for receiving and analyzing signals indicative of conditions measured by electronic devices, generating and sending activation signals, and/or receiving and analyzing read events from RFID readers. For instance, the back-end system 130 may include computing hardware or a virtual instance running on computing hardware (e.g., a cloud-based computing service). The computing hardware and/or the virtual instance may be configured to host a tracking module 134. The tracking module 134 may be configured to analyze the signals indicative of the conditions, generate the activation signals, and/or analyze the read events to determine progress of pallet(s). Results of the analysis may be stored in a tracking log 136. The tracking log 136 may be local to the back-end system 130 (e.g., stored on a computer-readable medium of the back-end system 130) or remotely available to the back-end system 130. In an example, the tracking log 136 may log information applicable to a number of RFID tags, pallets, and/or items. In another example, the tracking log 136 may be specific to an RFID tag, a pallet, and/or an item.

In addition, the operational environment may include an alert system. The alert system may be configured to alert operators of pallet progress through the storage facility, where the alerts may follow different presentation modalities, such as visual, audible, and tactile presentations. In an example, the alert system may include a light 140 at the outbound door 112. The light 140 may be turned on and off at a certain frequency, using a particular color, or according to a certain flashing pattern to visually present an alert. For instance, a green light may indicate that a pallet properly progressed through the outbound door 112. In comparison, a yellow light may indicate that the outbound door 112 may have been open but that no RFID tag was read. A red light may indicate that an RFID tag was read but that the corresponding pallet should not be going through the outbound door 112. Generally, the alert system including the light 140 (and associated control and processing modules) may be communicatively coupled with the back-end system 130. The tracking module 134 may control certain operations of the alert system (e.g., the activation and presentation parameters of the light 140) based on the analysis of RFID read events and/or data captured by the different electronic devices.

As illustrated, a pallet 150 may be progressing through the storage facility. An RFID tag 152 may be attached to a surface of the pallet 150. The RFID tag 152 may include a unique identifier of the pallet 150. The pallet 150 may retain a number of items 154. RFID tags 156 may be attached to the items. Each RFID tag 156 may include a unique identifier of the respective item 154.

The pallet 150 may be moved and may approach the outbound doors 112 and 122. A carrier (not shown), such as a forklift or a pallet jack, may facilitate the movement. An operator (not shown), such as a human operator or an automated operator, may operate the carrier. In an example, an RFID tag may be attached with each of the carrier and/or operator.

As the pallet 150 approaches the outbound doors 112 and 122, electronic devices in proximity of these doors may detect various conditions. The tracking module 134 may analyze these conditions and determine that the likelihood that the pallet 150 should be exiting through the outbound door 112 is higher than that of exiting through the adjacent outbound door 122. In that case, the tracking module 134 may generate an activation signal 132 to activate the RFID reader 110, as opposed to the adjacent RFID reader 120, because of the likelihoods. In the activated state, the RFID reader 110 may read the RFID tag 152, the RFID tags 154, and/or the RFID tags attached to the carrier and/or operator. In addition, the RFID reader 110 may generate and send a read event 118 to the back-end system 130. The tracking module 134 may analyze the read event 118, determine the progress of the pallet 150, update the tracking log 136, and/or activate the light 140.

In an example of determining the highest likelihood of a certain path of the pallet 150 (e.g., the pallet 150 about to exit through the outbound door 112) or, equivalently, of the closest proximity to the RFID reader 110, an electronic device may sense that a status 116 of the outbound door 112 is open. In comparison, the same or a different electronic device may sense that a status of the outbound door 122 is shut. In addition, the same or a different electronic device may sense that a motion 158 of the pallet 150 is towards the outbound door 112 and indicates that the pallet 150 is within a threshold distance from the outbound door 112 (equivalently, from the RFID reader 110 or a perimeter of the read zone 114). The back-end system 130 may receive signals from the electronic device(s) indicating such conditions. The tracking module 134 may analyze these conditions and may generate the activation signal 132.

Hence, as illustrated by this example, the risk of cross-read by the second RFID reader 120 may be reduced. In particular, because of the determination that the pallet 150 is more likely to be exiting through the outbound door 112 and the resulting activation of the associated RFID reader 110, the second RFID reader 120 may not be activated. Because the second RFID reader 120 may remain in an idle state as the pallet 150 may progress through the outbound door 112, no read event may be captured and sent by the second RFID reader 120 to the back-end system 130. Thus, the back-end system may not receive cross-read events, thereby reducing network bandwidth and the need to process and store such events.

Figure 2:
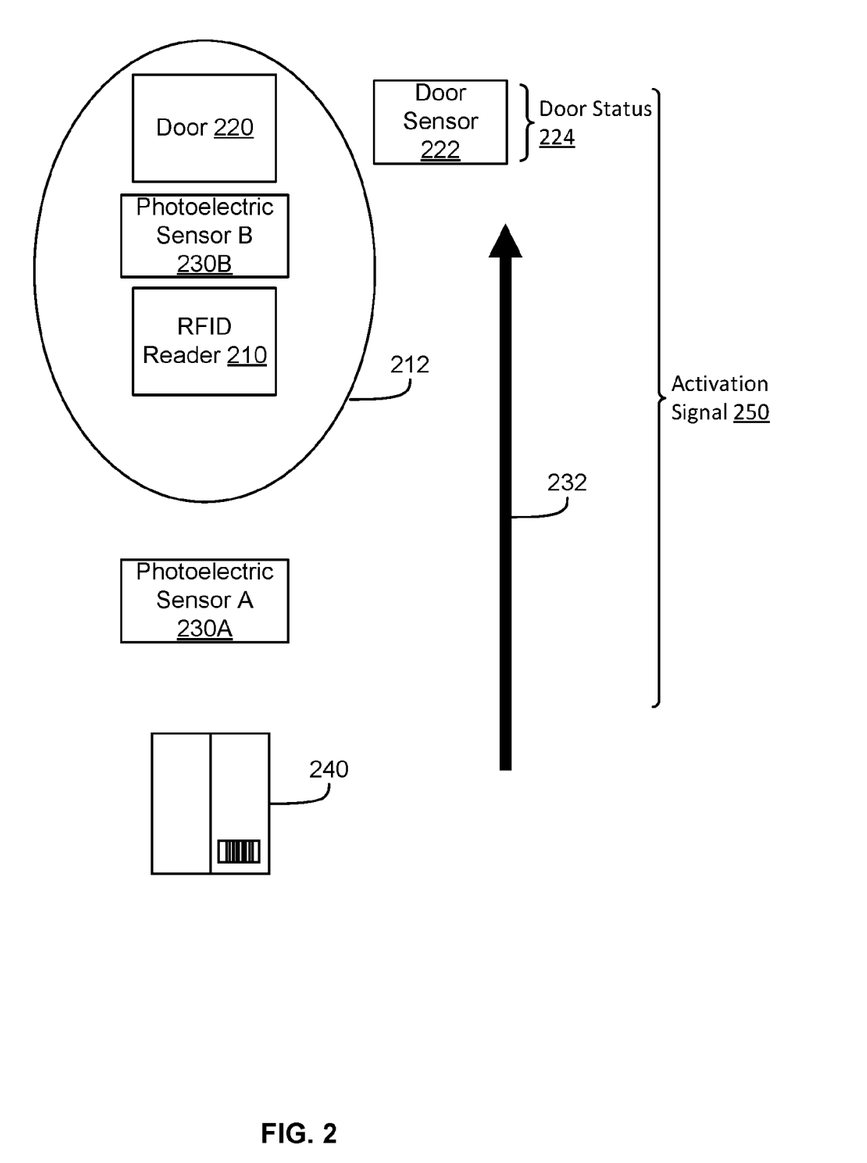
FIG. 2 illustrates an example configuration of electronic devices for detecting conditions associated with progress of an item retainer, according to an embodiment of the present disclosure.

FIG. 2 illustrates an example configuration of electronic devices for detecting conditions associated with progress of an item retainer. The example configuration may include door and photoelectric sensors. However, other types of electronic devices may be possible, such as other types of sensors (e.g., optical sensors, depth sensors, pressure sensors, motion sensors), switches, potentiometers, and any other suitable device for detecting a predefined condition.

As illustrated, an RFID reader 210 may be located in proximity to a door 220, such as a certain distance away from the door 220. The RFID reader 210 may cover a read zone 212. In an example, the read zone may include the location of the door 220. Generally, the read zone 212 may represent a volume of space within which an RFID tag may be read by the RFID reader 210. FIG. 2 illustrates an ellipsoidal read zone, but other shapes may be possible. In particular, the volume may be defined by the orientation of the antennas of the RFID reader 210, intensity and frequency of transmitted RF signals, objects in the operational environment, and other RF-related factors. In an example, the main lobe of the read zone 212 may be oriented towards the door 220. In this example, the RFID reader 210 may include four antennas distributed in two sets. The four antennas may be oriented towards the door 220 and cover a volume having a certain maximum height. The maximum height may be defined based on the maximum expected height of an RFID tag attached to a pallet. For example, if the maximum of the RFID height is about sixty inches, the maximum height of the read zone 212 may be about seventy inches.

A door sensor 222 may be installed proximate to the door 220, such as at a panel of the door 220 or at a certain distance away from the door 220. The door sensor 222 may be configured to detect a door status 224, such as whether the door may be open or closed. For instance, the door sensors 22 may include any of a motion sensor or an optical sensor. Other devices may be additionally or alternatively used to detect the door status 224, such as mechanical, electrical, electromechanical, magnetic, or optical devices.

In addition, a number of photoelectric sensors may be installed in proximity of the door 220 (or, equivalently, the RFID reader 210 or the read zone 212). FIG. 2 illustrates two photoelectric sensors 230A and 230B. However, a smaller or larger number of such sensors may be used.

As illustrated, the photoelectric sensors 230A and 230B may be located at opposite sides relative to the RFID reader 219 and along a direction relative to movement of pallets. In an example, the desired direction may be an outward direction. Accordingly, the photoelectric sensor 230A may be away from the door 220 and proximate to (e.g., on the outside of) a perimeter point of the RFID read zone 212. In comparison, the photoelectric sensor 230B may be located within the perimeter and on the opposite side from the RFID reader 210. The two locations may be set such that, when the photoelectric sensors 230A and 230B detect a pallet, the pallet may be moving in the direction towards the door 220 and is in proximity to the RFID reader 210. In another example, the photoelectric sensors 230A and 230B may be on a same side of the RFID reader 210. For instance, the photoelectric sensors 230A and 230B may be proximate to and on the outside of a perimeter point of the RFID read zone 212 such that, when the photoelectric sensors 230A and 230B detect a pallet, the pallet may be in proximity to the RFID read zone 212. In yet another example, the photoelectric sensors 230A and 230B may be further away. In this example, upon detecting of the pallet, a speed of travel of the pallet may be used in connection with the distance to generate timing information associated with an expected arrival time of the pallet to the read zone 212. The timing information may be used to activate the RFID reader 210 based on the expected arrival time such that the RFID reader 210 may be in an activated state once the pallet arrives to the read zone 212.

Using two or more photoelectric sensors may enable the sensing of multiple parameters related to pallet motion. In an example, the distance between the two photoelectric sensors 230A and 230B may be smaller than an average dimension (e.g., width or length) of a pallet. For instance, if the average dimension is about forty inches, the distance may be about twenty inches. Using a relatively smaller distance may reduce false positives associated with sensing the pallet motion. In particular, the pallet motion may be detected only when the pallet obstructs both photoelectric sensors 230A and 230B. In another example, direction and travel speed of the travel motion may be sensed based on the distance between the two photoelectric sensors 230A and 230B and the timing of when each of the photoelectric sensors 230A and 230B detects the pallet.

Hence, an operator may operate a carrier to move a pallet 240 including an RFID tag towards the door 220. To travel through the door 220, the operator may open the door. Additionally or alternatively, the door 220 may automatically open as the pallet 240 approaches the door (e.g., based on a sensor). Accordingly, the door sensor 222 may detect that the door status 224 is open. In addition, a motion 232 of the pallet 240 may be sensed based on readings of the photoelectric sensors 230A and 230B. The door status 224 and the motion 232 may be used in combination to generate an activation signal 250. The activation signal may activate the RFID reader 210, thereby enabling the RFID reader 210 to attempt reading the RFID tag of the pallet 240 as the pallet 240 travels within the read zone 212.

Generally, RFID refers to a wireless, non-contacting system for transferring data by way of radio frequency electromagnetic fields. In an RFID system, data transfers occur in the form of modulated signals transmitted between an RFID tag (or an RFID device), which may include various communication components, logic or circuitry, and an RFID reader, which may include antennas or other like devices. Data stored within a microchip or other storage device associated with the RFID tag may be sent to the RFID reader, which may interpret not only the data received in the RFID signal, but also other relevant information or attributes of the RFID signal, such as an intensity or a frequency of the RFID signal, as well as a direction from which the RFID signal originated, a range traveled by the RFID signal or at least some of the information or data included in the RFID signal. The transfer of the RFID signal is initiated when an electric field or a magnetic field transmitted by an RFID reader is sensed by an RFID tag, which transmits information or data that may be stored in association with the RFID tag in one or more microchips or other storage devices.

RFID systems provide a number of advantages over similar systems for the short-range transfer of information or data. First, an RFID tag may be formed of components having remarkably small, compact shapes and sizes, and tags that are as thin as a sheet of paper or smaller than a grain of rice are quite common. Additionally, unlike a bar code (e.g., a one-dimensional bar code or a two-dimensional "QR" code), an RFID tag need not be provided within a line of sight of an RFID reader in order to successfully transmit data. Therefore, RFID tags may be concealed or embedded into many different types of objects of any size or shape, as well as humans or other animals. Next, an RFID tag may be programmed with a fixed set or packet of "read-only" data which may be transmitted to an RFID reader countless number of times in theory, or reprogrammed with modifiable sets of data that may be written and rewritten, as needed, based on the application in which the RFID tag is provided. Moreover, and perhaps most importantly, while an active RFID tag includes and utilizes a local power source, such as a battery, a passive RFID tag does not require any power in order to successfully transmit a set or packet of data to an RFID reader, and may therefore transmit such data when power supplies are unavailable or in environments where providing power to the RFID tag is infeasible.

RFID signals may be transmitted from an RFID tag to an RFID reader in many different formats and at many different frequency levels. An RFID tag that transmits signals within low frequency (LF), medium frequency (MF), or high frequency (HF) levels (e.g., approximately 3 kilohertz to 30 megahertz, or 3 kHz-30 MHz) may transfer relatively small-sized sets or packets of data over short ranges (e.g., between ten and one hundred centimeters, or 10-100 cm). Other RFID tags may transmit signals at higher frequency levels, such as ultrahigh frequency (UHF) or microwave levels (e.g., approximately 300 megahertz to 300 gigahertz, or 300 MHz-300 GHz) including larger sets or packets of data at ranges of one meter (1 m) or longer.

A signal transmission from an RFID tag to an RFID reader may be achieved in any number of ways. An inductively coupled RFID tag is an RFID tag that is powered by energy obtained from magnetic fields generated by an RFID reader, and may be coupled to the RFID reader using this energy. In this regard, an RFID reader may include one or more coils through which an electric current may pass, thereby causing a magnetic field to be generated by the RFID reader according to Ampere's Law. Likewise, an inductively coupled RFID tag may also include one or more coils. When the RFID tag passes within a particular range of the RFID reader, an electric current is generated within the coils of the RFID tag, thereby coupling the RFID reader and the RFID tag based on the magnetic flux passing through the respective sets of coils. The electric current passing through the coils of the RFID tag may then power internal circuits within the RFID tag and cause an RFID signal to be transmitted from the RFID tag to the RFID reader accordingly. Thus, inductively coupled RFID tags are commonly used in powerless environments where a passive system for transmitting signals may be required.

Additionally, an RFID tag may be coupled by any number of other modes. For example, capacitively coupled RFID tags include coupling plates that are designed to correspond to a plate of an RFID reader. When the RFID tag is placed in sufficiently close proximity to the RFID reader, thereby causing the corresponding coupling plates of the RFID tag and the RFID reader to be aligned in parallel with one another and within a short range, a transfer of data from the RFID tag to the RFID reader is achieved. Unlike an inductively coupled RFID tag, which is powered by a magnetic field generated by an RFID reader, a capacitively coupled RFID tag is powered by an alternating electric field generated by an RFID reader. For this reason, capacitively coupled RFID tags usually have more limited operating ranges than inductively coupled RFID tags and are typically employed in near-field communication environments. Similarly, a backscatter-coupled RFID tag receives power emitted from an RFID reader's antenna. A portion of the emissions from the RFID reader is received by a corresponding antenna of the RFID tag and may be filtered or rectified, as necessary, in order to trigger a transfer of data from the RFID tag to the RFID reader. Any type or mode of coupling between an active, semi-active (e.g., powered on a temporary basis or for limited purposes) or passive RFID tag and an RFID reader may be utilized in accordance with the present description.

In addition to RFID tags which are automatically coupled with an RFID reader, the systems and methods of the present description may further include an RFID tag, such as a passive RFID tag, which may be manually activated, e.g., coupled upon a manual action, by a human or machine in order to cause a transmission of a data signal from the RFID tag to one or more RFID readers. A manually activated RFID tag may include physical or virtual switches that may close a circuit within the RFID tag and thereby permit the RFID tag to function as a data transmitter in the presence of an electric or magnetic field. For example, a manually activated RFID tag may include capacitive elements that define a capacitor within the RFID tag and may effectively close a circuit within the RFID tag when such elements detect bioelectricity from a user. The term "bioelectricity" generally refers to electrical charges or electric field gradients that may be stored within a living body, such as a human body, which contains blood and other matter having a variety of positively and negatively charged ions (e.g., sodium, chloride and others). Bioelectricity within a body may cause a change in capacitance of such elements in a vicinity of a location touched by the body (e.g., a digit such as a finger or thumb), due to disruptions in electrical fields caused by the body's presence, thereby further causing a change in the time constant of the RFID tag, and a discharge of the capacitor in an amount that may be defined as a function of the resistance of the capacitive elements.

According to some embodiments, such capacitive elements may be formed into a layered stack or may include a substantially linear or planar gap or break, and may be covered with a flexible protective layer formed from one or more plastics or rubbers (e.g., acrylics, vinyls, polyurethanes, or the like), or other like materials. The protective layer may be adhered to one or more capacitive elements of an RFID circuit, which may include elements formed from a conductive material such as aluminum, copper, silicon, or indium tin oxide that are separated by an air gap. When a user touches a protective layer of an RFID tag with a finger, which is a bioelectric conductor, a change in the effective capacitance (on the order of approximately one picofarad) between the elements, which are also conductors, in a vicinity of a point or points of contact with the protective layer, is introduced. Such contact forms a conductive bridge across the elements, thereby causing disruptions in electrical fields in the vicinity of one or more of the elements, and further causing an internal current flow through the RFID tag circuit.

In addition to capacitive elements, a circuit of an RFID tag may include other components for enabling a manual actuation thereof by a human or a machine, including one or more substantially planar conductive elements that may be separated by an air gap. Such an air gap between the conductive elements defines an open switch within the circuit of the RFID tag, which may also be covered with a flexible protective layer that may be formed from one or more plastics, rubbers, or other like materials. When a user contacts an external surface of the RFID tag corresponding to the air gap, e.g., the flexible protective layer over the air gap, at least two of the conductive elements are placed in contact with one another, thereby bridging the air gap between the conductive elements and closing the open switch. Subsequently, an internal current flow through the RFID tag circuit is enabled. Because the bridging of the air gap and the closure of the open switch is registered by manually driven electrical contact, a manually activated RFID tag including substantially planar conductive elements does not require bioelectricity in order to operate properly, and a user may interact with the RFID tag using not only his or her fingers or hands (which may be gloved or ungloved), but also a stylus, a pointer or another like object.

Figure 3:
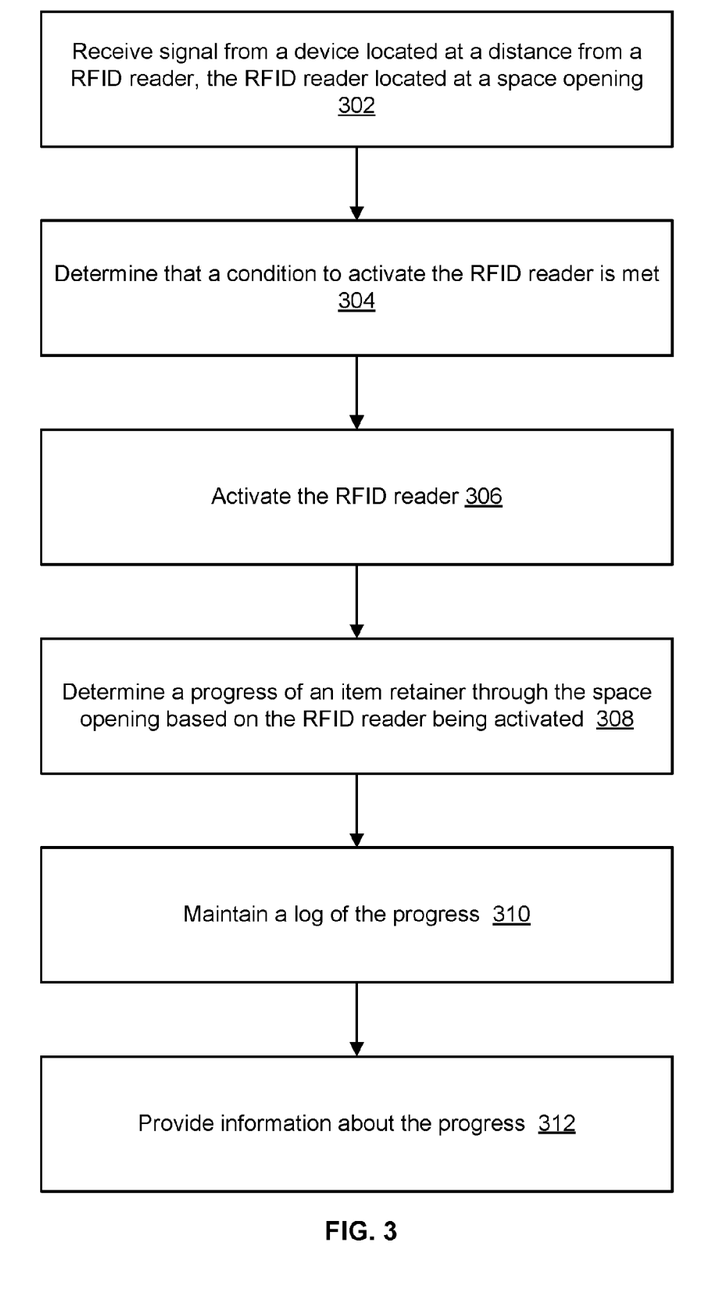
FIG. 3 illustrates an example flow for activating an RFID reader based on a number of sensed conditions and for determining progress of an item retainer based on a number of read events from the RFID reader, according to an embodiment of the present disclosure.
Figure 4:
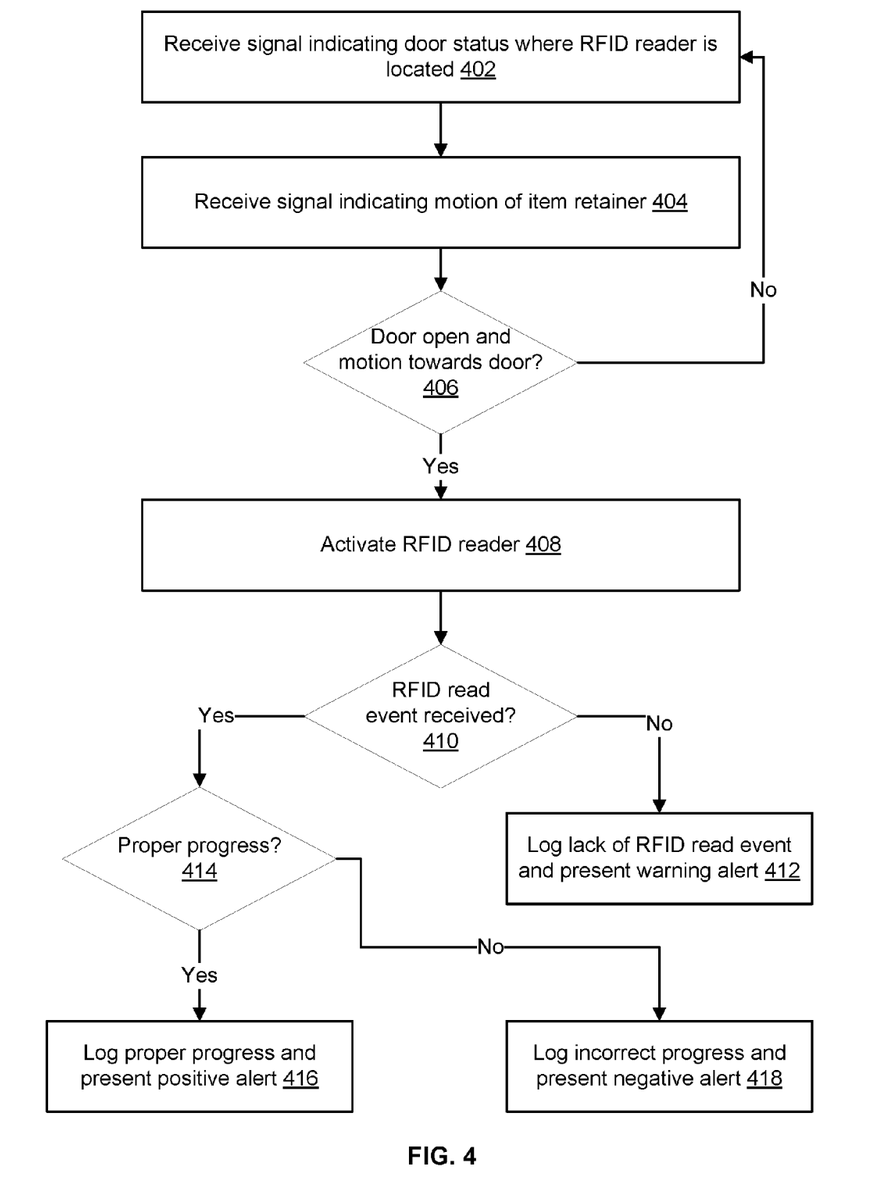
FIG. 4 illustrates another example flow for tracking the progress of an item retainer based on read events received from an activated RFID reader, according to an embodiment of the present disclosure.
Figure 5:
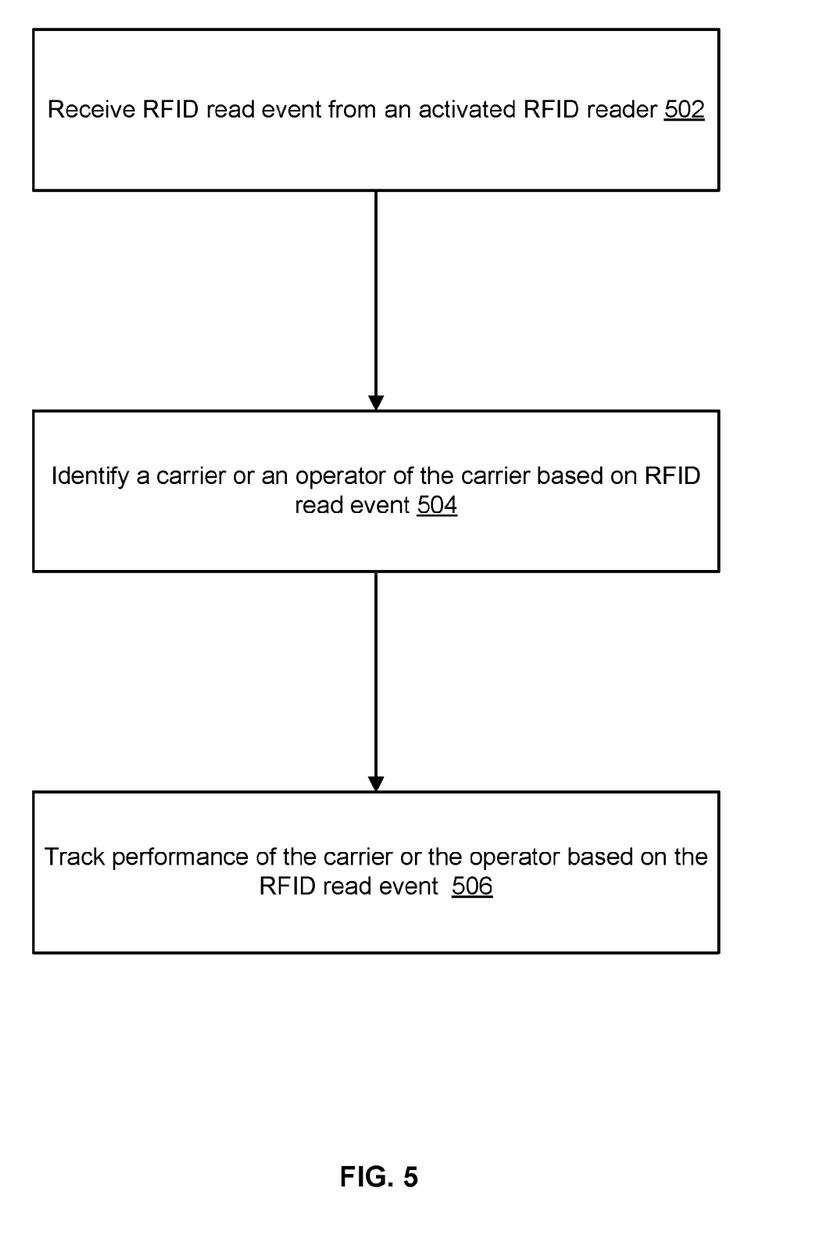
FIG. 5 illustrates an example flow for tracking performance of a carrier and/or an operator of a carrier based on activation of an RFID reader, according to an embodiment of the present disclosure.

Turning to FIGS. 3-5, the figures illustrate example flows for activating a particular RFID reader based on a number of conditions. The activated RFID reader may generate a number of read events. The read events may be analyzed to determine a progress of a pallet, or any other type of item retainer, through a certain storage facility, or any other space. A computer system is illustrated as performing operations of the example flows. In an example, the computer system may represent a back-end system hosting a tracking module (e.g., the back-end system 130 hosting the tracking module 134 of FIG. 1). Generally, the computer system may include a processor and a memory coupled to the processor. The processor may execute computer-readable instructions stored in the memory. The computer-readable instructions may include instructions for performing the operations.

In the interest of clarity of explanation, the activation of an RFID reader from a set of two RFID readers located at respective outbound doors is described in connection with the example flows. However, the example flows may similarly apply to a larger number of RFID readers and/or to progress of the pallet through other space openings within a space.

Some of the operations of the example flows of FIGS. 3-5 may be similar. Such similarities are not repeated herein in the interest of clarity of explanation. Also, while the operations are illustrated in a particular order, it should be understood that no particular order is necessary and that one or more operations may be omitted, skipped, and/or reordered.

FIG. 3 illustrates an example flow for activating an RFID reader based on a number of sensed conditions and for determining progress of an item retainer based on a number of read events from the RFID reader. The example flow may start at operation 302, where the computer system may receive a signal from an electronic device located at a distance from an RFID reader. The RFID reader may be located at an outbound door, or some other space opening. The electronic device may include any suitable device, such as a sensor, a switch, and/or a potentiometer and associated control and processing unit(s) to sense a condition associated with the RFID reader and/or the space opening. The electronic device may encode and send this signal to the computer system over a network, such as a data communication network.

In an example, the electronic device may include a door sensor located at the outbound door. In this example, the signal may indicate a status of the outbound door (e.g., open or shut). In another example, the electronic device may include a number of photoelectric sensors. If more than one photoelectric sensor is used, the computer system may receive multiple respective signals. The signal(s) may indicate a motion of a pallet, or some other item retainer, towards the outbound door.

At operation 304, the computer system may determine that a condition to activate the RFID reader may be met based on the signal. For example, the computer system may determine the sensed condition (e.g., the door status and/or the motion of the pallet) from the signal and may compare the sensed condition to an activation condition. The activation condition may be defined in a set of rules maintained by the computer system. The activation condition may be met when the sensed condition matches the activation condition. The set of rules may specify actions that the computer system may perform when the activation condition is met.

In an example, the activation condition may be met when the door status is open, the motion of the pallet is towards the outbound door, and/or the pallet is proximate to a perimeter of a read zone of the RFID reader. Such an activation condition, when met, may indicate a higher likelihood of the pallet traveling through the read zone relative to corresponding likelihoods in other read zones (e.g., an adjacent read zone of a proximate RFID reader). Of course, other types of activation conditions may be predefined for reducing the likelihoods of unintended RFID reads, where an activation condition may be met by one or more of sensed conditions. The set of rules may specify that an RFID reader should be activated, when the RFID reader covers the read zone having the highest likelihood (or a likelihood of exceeding a predefined threshold).

At operation 306, the computer system may activate the RFID reader based on a determination that the condition is met as performed at operation 304. The activation may include sending an activation signal to the RFID reader over a network, such as a data communication network. Upon receipt and processing of the activation signal, the RFID reader may switch from an idle state to an activated state and may stay in the activated state for a period of time. Alternatively, the RFID reader may initially be in an off state. A control unit coupled with the RFID reader may receive and process the activation signal and, accordingly, turn on the RFID reader for the period of time. During that period of time, the RFID reader may perform a number of RFID reads according to a predefined read cycle of the RFID reader.

In an example, the activation signal may include timing information. The timing information may specify when and/or for how long the RFID reader should be active. The start of the active time period may depend on a number of factors. An example factor may include the relative location of the sensing electronic device to the RFID reader. For instance, close proximity may correspond to an immediate or near immediate active time period. In comparison, if a large distance exists between the sensing electronic device and the RFID reader, the computer system may determine an expected arrival time of the pallet to the read zone and may set the start of the active time period around the expected arrival time.

The length of the active time period may also depend on a number of factors. In an example, the length may be predefined to cover a predefined amount of time (one minute) or a predefined number of read cycles (e.g., twelve read cycles). In another example, the length may be defined as a function of the travel speed of the pallet. The faster the travel speed may be, the shorter the time period may be. In yet another example, changes in sensed conditions may trigger the computer system to instruct the RFID reader to re-enter the idle state. For instance, if the door status changes to shut, the time period may end immediately or nearly immediately after the outbound door shuts.

At operation 308, the computer system may determine a progress of the pallet (or, more generally, an item retainer) through the outbound door (or, more generally, through a space opening) based on the RFID reader being activated. In an example, determining the progress may include tracking the location of the pallet through the storage facility. In another example, determining the progress may include checking whether the pallet is travelling through the expected outbound door. Yet another example of determining the progress may include cross-checking that the pallet contains the expected items. These and other examples of progress determination are further illustrated in the next figures.

Generally, the RFID reader may, when activated, read an RFID tag attached to the pallet. If read, the RFID reader may generate and send a read event. The computer system may analyze the read event to determine the progress. If, however, no RFID tag was read, no read event may be generated. The computer system may track the situations when activation conditions are met (and, thereby, read events are expected) but no read events are received. Such tracking may be used for troubleshooting the tracking system (e.g., whether an untagged item retainer, object, carrier, or operator is erroneously triggering the computer system to activate the RFID reader and/or whether a malfunctioning sensing electronic device or RFID reader exists).

At operation 310, the computer system may maintain a log of the progress. For example, the computer system may store information about the activation condition (e.g., timing, the sensed conditions, and an identifier(s) of the sensing electronic device(s)), the read event(s), a unique identifier the pallet from the read event(s), unique identifier(s) of items contained by the pallet from the read event(s), location of pallet (e.g., expressed as approximate location to the RFID reader or to the outbound door), and other progress-related information. Over time, the log may indicate how the pallet progressed throughout the storage facility based on various read zones covered by different RFID readers.

At operation 312, the computer system may provide information about the progress. Different types of information may be possible. One example type may relate to the determined progress. For example, the computer system may activate an alert system to present the progress using different presentation modalities. The alert system may include a light at the outbound door that may be flashed based on the type of progress (e.g., whether the pallet is traveling through the expected outbound door, containing the expected items, and/or other progress-related information). The alert system may also include a handheld device located on the operator. The handheld device may beep, flash, vibrate, or present a message about the type of progress.

Another type of the information may depend on the maintained log. For example, the computer system may drive a user interface of a client device. The user interface may present the location of the item in real time or substantially real time or a history of the location as the item travels through the storage facility.

FIG. 4 illustrates another example of tracking the progress of the pallet (or, more generally, an item retainer) based on read events received from an activated RFID reader. Although the example flow illustrates the use of door and photoelectric sensors, other types of electronic devices may be similarly used.

The example flow may start at operation 402, where the computer system may receive a first signal indicating a door status. The door status may be of an outbound door (or, more generally, any door) and may indicate whether the outbound door (or a portion thereof) is open or shut. A door sensor located at or in proximity of the outbound door may sense the door status and, accordingly, generate and send the first signal to the computer system. An RFID reader may be located in proximity of the door and configured to read RFID tags attached to pallets and items exiting through the outbound door.

At operation 404, the computer system may receive a second signal indicating a motion of a pallet. In an example, a number of photoelectric sensors may be located at a distance away from the outbound door. The photoelectric sensor(s) may be configured to detect the motion and, accordingly, generate and send the second signal(s) to the computer system.

At operation 406, the computer system may determine whether the outbound door is open and whether the motion of the pallet is toward the outbound door. For example, the computer system may determine the door status from the first signal and the motion from the second signal(s). If such two activation conditions are met, operation 408 may be followed, where the computer system may activate the RFID reader. Otherwise, the computer system may determine that the RFID reader need not be activated at this time. The monitoring of the door status and motions of pallets may be continuously repeated by iteratively performing operations 402-406.

At operation 410, the computer system may determine whether an RFID read event may have been received. Because the RFID reader may have been activated, the computer system may expect at least one read event to be received from the RFID reader, where the expected read event may be generated by the RFID reader while in the activated state. If no RFID read event is received, the computer system may perform operation 412 associated with an analysis of the lack of such an event. Otherwise, the computer system may perform operation 414 associated with an analysis of the RFID read event.

At operation 412, the computer system may log the lack of the RFID read event and may present a warning alert. For example, the computer system may store the activation conditions, identifiers of the door and photoelectric sensors, and the timing of when the first and second signals were received. In addition, the computer system may activate a light at the outbound door to alert operators that the RFID reader was activated but that no read event may have been received. The log and/or the warning alert may facilitate identifying the cause of the lack of the RFID read event. For instance, an operator may access the log and document the cause (e.g., the outbound door was opened for air flow and not to move packaged items, or a carrier mistakenly approached the outbound door). In another illustration, if the log indicates a pattern of incorrect activation conditions from a particular sensor, this pattern may identify that the particular sensor may have become defective.

At operation 414 the computer system may have received at least one RFID read event. In an example, the read event may identify the pallet and/or the items that the pallet may contain. For instance, the RFID reader may read the RFID tag attached to the pallet and/or the RFID tags attached to the items. As such, the computer system may determine, at operation 414, whether the pallet is properly progressing based on one or more of the RFID read events.

For example, if the RFID tag of the pallet was read, the computer system may determine the unique identifier of the pallet from the RFID read event. The computer system may also access a progress plan of the pallet based on the unique identifier. The progress plan may be stored locally at the computer system or available from a remote storage and may identify the expected outbound door for the pallet's progress. The computer system may compare identifiers of the expected outbound door to the actual outbound door (e.g., the one covered by the activated RFID reader). If the door identifiers a mismatch, the progress may be improper. Otherwise, the progress may be proper.

In another example, the RFID tag of the pallet may not have been read for different reasons (e.g., RF obstruction). Instead, the RFID tags of the items may have been read. Accordingly, the computer system may determine unique identities of the items from the RFID read event. The computer system may access a manifest of item distribution per pallet. By comparing the unique identifiers to the ones from the manifest, the computer system may identify the pallet. Similarly to the above example, once the pallet is identified, the progress plan may be accessed to determine whether the progress is proper or improper.

In yet another example, the RFID tags of the pallet and the items may have been read. In this example, the computer system may cross check the respective unique identifiers with the manifest to determine if the pallet contains any misplaced item or is missing any expected item. If so, the progress may be improper. Otherwise, the progress may be proper.

In a further example, the computer system may determine that the RFID tag of the pallet or, that the pallet itself, has become stationary and has not been moved for a period of time. That may be the case, when the pallet has been left in proximity of the outbound door, or the RFID tag has been removed from the pallet and left in proximity of the outbound door. In either case, the computer system may access the log and determine, based on the unique identifier of the pallet, the last known location of the pallet. If the last known location is at the current outbound door, the computer system may determine that the progress is improper. Otherwise, the progress may be proper.

If the progress is proper, operation 416 may be performed, where the computer system may log that the progress is proper and may present a positive alert. For instance, the computer system may activate the light at the outbound door and/or may provide the positive alert to the handheld device of the operator.

On the other hand, if the progress is improper, operation 418 may be performed, where the computer system may log the incorrect progress and present a negative alert. For instance, the computer system may store the type of the incorrect progress (e.g., pallet exiting wrong outbound door, pallet containing incorrect items, pallet becoming stationary) and the reason for the determination (e.g., mismatches between expected and actual outbound doors, mismatches between read RFID tags of items and manifest, current location and last location are the same). The negative alert may be presented via the light and/or via the handheld device. Each type of incorrect progress may have a unique negative alert (e.g., a single light flash for wrong outbound door, two light flashes for incorrect items, a solid light for stationary pallet).

FIG. 5 illustrates tracking performance of a carrier and/or an operator of a carrier based on activation of an RFID reader. In an example, the operator may operate the carrier, such as a forklift or a pallet jack, to move the pallet through the storage facility. An RFID tag may be attached to the carrier. An RFID tag may also be attached with an operator. For instance, if the operator is a human operator, the operator's RFID tag may be attached to an employee badge, to a handheld device, to an article of clothing, or to an accessory of the operator. Hence, RFID read events may also identify the carrier and/or the operator. Such read events may be analyzed to track the performance of the carrier and/or the operator.

The example flow of FIG. 5 may start at operation 502, where the computer system may receive an RFID event from an activated RFID reader. For example, as the operator and/or the carrier approach the respective outbound door, the RFID reader may be activated dependently on whether an activation condition(s) is (are) met as described herein above. Thus, the operator and/or carrier may properly cause the activation by moving the pallet. In addition, the operator and/or carrier may improperly cause the activation by approaching the outbound door for reasons other than moving the pallet.

At operation 504, the computer system may identify the carrier and/or the operator based on the RFID read event. For instance, upon activation, the RFID reader may read the carrier's RFID tag and/or the operator's RFID tag. Accordingly, the read event may include a unique identifier of the carrier and/or operator.

At operation 506, the computer system may track the performance of the carrier and/or operator based on the RFID read event. The performance tracking may involve a number of factors. Generally, these factors may relate to whether the pallet was moved through the correct outbound door, whether the correct carrier moved the pallet, and/or whether the correct operator moved the pallet. The computer system may degrade the performance of the carrier and/or the operator if the factors indicate incorrect movement. Conversely, the performance may be increased if repeatable and/or consistently correct movement is determined over time.

In an example, if the pallet was moved through the wrong outbound door, the computer system may degrade the performance and alert the operator via a message to the handheld device. In addition, the performance may be logged. Repeated errors over time may result in alerts to other operators (e.g., a supervisor of the operator) and a recommendation for training.

In another example, the computer system may access the progress plan of the pallet. The progress plan may identify the planned carrier and/or the planned operator. If mismatches exist between the actual carrier and/or operator and the planned carrier and/or operator, the performance of both the actual and planned carriers and/or of both the actual and planned operators may be degraded.

Figure 6:
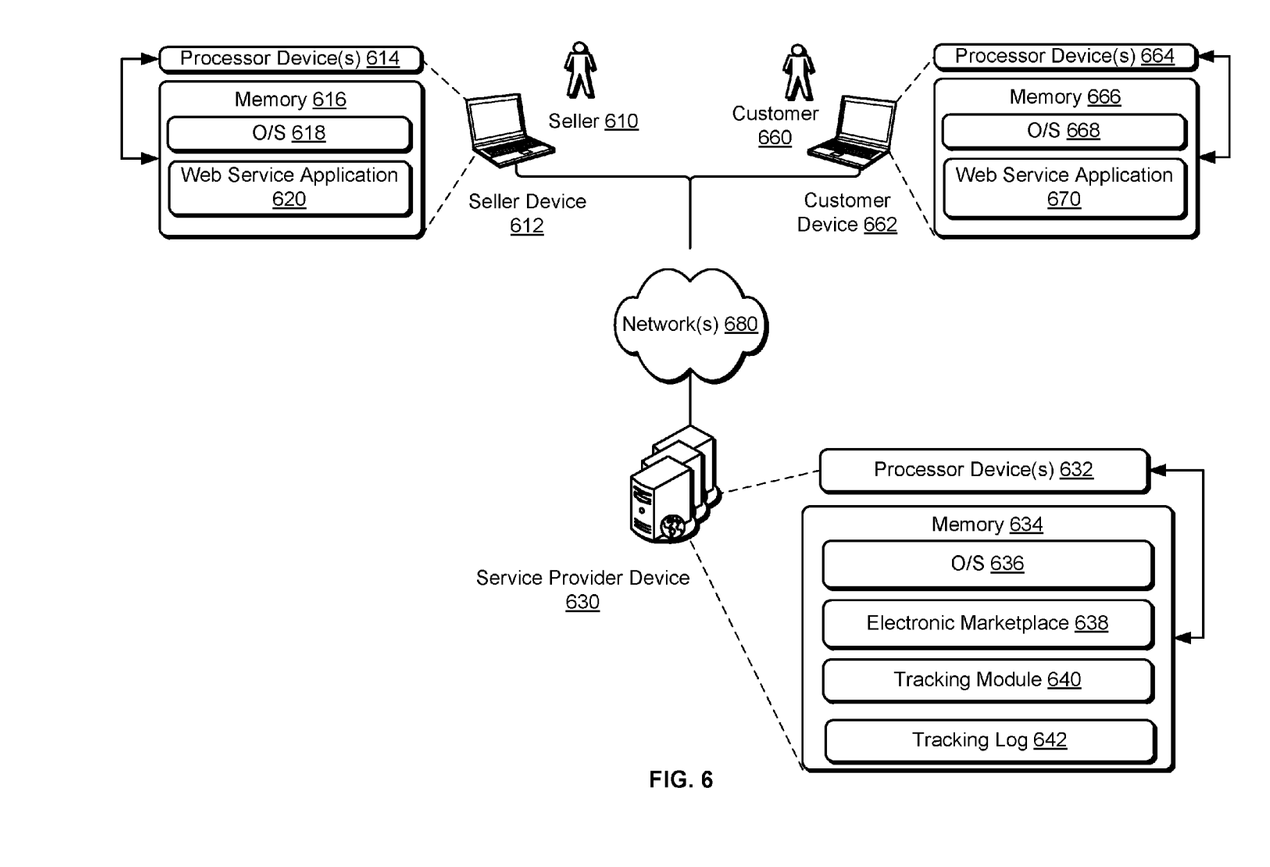
FIG. 6 illustrates example end-to-end architecture of a computing environment for processing RFID read events, according to an embodiment of the present disclosure.

FIG. 6 illustrates example end-to-end architecture of a computing environment for detecting activation conditions, activating RFID readers, and processing RFID read events. Activation conditions may be detected by a number of electronic devices. RFID read events may be generated by RFID readers and processed by a computer system. Such components may be implemented as part of the computing environment to facilitate tracking of items in a storage facility. The items may be available for purchase from an electronic marketplace associated with the storage facility. The service provider may implement a tracking module to track the pallets moving the items within the storage facility. The items may be listed for offering by a seller 610 and/or the service provider 630 and may be available for ordering by a customer 660.

In a basic configuration, the seller 610 may utilize a seller device 612 to access local applications, a web service application 620, a seller account accessible through the web service application 620, a web site or any other network-based resources via one or more networks 680. In some aspects, the web service application 620, the web site, and/or the seller account may be hosted, managed, and/or otherwise provided by one or more computing resources of the service provider, such as by utilizing one or more service provider devices 630. The seller 610 may use the local applications and/or the web service application 620 to interact with the network-based resources of the service provider and perform seller-related transactions. These transactions may include, for example, offering items for sale.

In some examples, the seller device 612 may be any type of computing devices such as, but not limited to, a mobile phone, a smart phone, a personal digital assistant (PDA), a laptop computer, a thin-client device, a tablet PC, etc. In one illustrative configuration, the seller device 612 may contain communications connection(s) that allow the seller device 612 to communicate with a stored database, another computing device or server, seller terminals, and/or other devices on the networks 680. The seller device 612 may also include input/output (I/O) device(s) and/or ports, such as for enabling connection with a keyboard, a mouse, a pen, a voice input device, a touch input device, a display, speakers, a printer, etc.

The seller device 612 may also include at least one or more processing units (or processor device(s)) 614 and at least one memory 616. The processor device(s) 614 may be implemented as appropriate in hardware, computer-executable instructions, firmware, or combinations thereof. Computer-executable instructions or firmware implementations of the processor device(s) 614 may include computer-executable or machine-executable instructions written in any suitable programming language to perform the various functions described.

The memory 616 may store program instructions that are loadable and executable on the processor device(s) 614, as well as data generated during the execution of these programs. Depending on the configuration and type of seller device 612, the memory 616 may be volatile (such as random access memory (RAM)) and/or non-volatile (such as read-only memory (ROM), flash memory, etc.). The seller device 612 may also include additional storage, which may include removable storage and/or non-removable storage. The additional storage may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 616 may include multiple different types of memory, such as static random access memory (SRAM), dynamic random access memory (DRAM), or ROM.

Turning to the contents of the memory 616 in more detail, the memory may include an operating system (O/S) 618 and the one or more application programs or services for implementing the features disclosed herein including the web service application 620. In some examples, the seller device 612 may be in communication with the service provider devices 630 via the networks 680, or via other network connections. The networks 680 may include any one or a combination of many different types of networks, such as cable networks, the Internet, wireless networks, cellular networks, and other private and/or public networks. While the illustrated example represents the seller 610 accessing the web service application 620 over the networks 680, the described techniques may equally apply in instances where the seller 610 interacts with the service provider devices 630 via the seller device 612 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer systems, etc.).

Similarly, a customer 660 may utilize customer device 662 to access local applications, a web service application 670 (or some other mobile application such as a "mobile app" available from an application store), a customer account accessible through the web service application 670, a web site, or any other network-based resources via the networks 680. In some aspects, the web service application 670, the web site, and/or the user account may be hosted, managed, and/or otherwise provided by the service provider devices 630 and may be similar to the web service application 620, the web site accessed by the computing device 612, and/or the seller account, respectively.

The customer 660 may use the local applications and/or the web service application 670 to conduct transactions with the network-based resources of the service provider. These transactions may include, for example, browsing for items, viewing items, ordering items, tracking shipping progress, and/or other transactions.

In some examples, the customer device 662 may be configured similarly to the seller device 612 and may include at least one or more processing units (or processor device(s)) 664 and at least one memory 666. The processor device(s) 664 may be implemented as appropriate in hardware, computer-executable instructions, firmware, or combinations thereof similarly to the processor device(s) 614. Likewise, the memory 666 may also be configured similarly to the memory 616 and may store program instructions that are loadable and executable on the processor device(s) 664, as well as data generated during the execution of these programs. For example, the memory 666 may include an operating system (O/S) 668 and the one or more application programs or services for implementing the features disclosed herein including the web service application 670.

As described briefly above, the web service applications 620 and 670 may allow the seller 610 and customer 660, respectively, to interact with the service provider devices 630 to conduct transactions involving items. The service provider devices 630, perhaps arranged in a cluster of servers or as a server farm, may host the web service applications 620 and 670. These servers may be configured to host a web site (or combination of web sites) viewable via the computing devices 612 and 662. Other server architectures may also be used to host the web service applications 620 and 670. The web service applications 620 and 670 may be capable of handling requests from many sellers 610 and customers 660, respectively, and serving, in response, various interfaces that may be rendered at the computing devices 612 and 662 such as, but not limited to, a web site. The web service applications 620 and 670 may interact with any type of web site that supports interaction, including social networking sites, electronic retailers, informational sites, blog sites, search engine sites, news and entertainment sites, and so forth. As discussed above, the described techniques may similarly be implemented outside of the web service applications 620 and 670, such as with other applications running on the computing devices 612 and 662, respectively.

The service provider devices 630 may, in some examples, provide network-based resources such as, but not limited to, applications for purchase and/or download, web sites, web hosting, client entities, data storage, data access, management, virtualization, etc. The service provider devices 630 may also be operable to provide web hosting, computer application development, and/or implementation platforms, or combinations of the foregoing to the seller 610 and customer 660.

The service provider devices 630 may be any type of computing device such as, but not limited to, a mobile phone, a smart phone, a personal digital assistant (PDA), a laptop computer, a desktop computer, a server computer, a thin-client device, a tablet PC, etc. The service provider devices 630 may also contain communications connection(s) that allow service provider devices 630 to communicate with a stored database, other computing devices or servers, seller terminals, and/or other devices on the network 680. The service provider devices 630 may also include input/output (I/O) device(s) and/or ports, such as for enabling connection with a keyboard, a mouse, a pen, a voice input device, a touch input device, a display, speakers, a printer, etc.

Additionally, in some embodiments, the service provider devices 630 may be executed by one or more virtual machines implemented in a hosted computing environment. The hosted computing environment may include one or more rapidly provisioned and released network-based resources. Such network-based resources may include computing, networking, and/or storage devices. A hosted computing environment may also be referred to as a cloud computing environment. In some examples, the service provider devices 630 may be in communication with the computing devices 612 and 662 via the networks 680, or via other network connections. The service provider devices 630 may include one or more servers, perhaps arranged in a cluster, or as individual servers not associated with one another.

In one illustrative configuration, the service provider devices 630 may include at least one or more processing units (or processor devices(s)) 632 and at least one memory 634. The processor device(s) 632 may be implemented as appropriate in hardware, computer-executable instructions, firmware, or combinations thereof. Computer-executable instruction or firmware implementations of the processor device(s) 632 may include computer-executable or machine-executable instructions written in any suitable programming language to perform the various functions described.

The memory 634 may store program instructions that are loadable and executable on the processor device(s) 632, as well as data generated during the execution of these programs. Depending on the configuration and type of the service provider devices 630, the memory 634 may be volatile (such as random access memory (RAM)) and/or non-volatile (such as read-only memory (ROM), flash memory, etc.). The service provider devices 630 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 634 may include multiple different types of memory, such as static random access memory (SRAM), dynamic random access memory (DRAM), or ROM.

Additionally, the computer storage media described herein may include computer-readable communication media such as computer-readable instructions, program modules, or other data transmitted within a data signal, such as a carrier wave, or other transmission. Such a transmitted signal may take any of a variety of forms including, but not limited to, electromagnetic, optical, or any combination thereof. However, as used herein, computer-readable media does not include computer-readable communication media.

Turning to the contents of the memory 634 in more detail, the memory may include an operating system (O/S) 636, code for an electronic marketplace 638, code for a tracking module 640, and tracking log 642. The tracking module 640 may be configured to track pallets based on RFID read events and provide information about the tracking via interfaces to the service provider 630, the seller device 612, and the customer device 662.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as that included in the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z each to be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
    a radio frequency identification (RFID) reader associated with an outbound door of a storage facility;
    a door sensor associated with the outbound door;
    a plurality of sensors located around the RFID reader; and
    a computer system configured to:
        detect that the outbound door is in an open position based at least in part on a first signal from the door sensor;
        detect that an item retainer has an outbound motion based at least in part on respective second signals from the plurality of sensors, the item retainer retaining items available from the storage facility and destined to a delivery vehicle through the outbound door;
        activate the RFID reader based at least in part on the open position of the outbound door and the outbound motion of the item retainer, the RFID reader activated for a predetermined amount of time and configured to read an RFID tag attached with the item retainer based at least in part on being activated; and
        generate a log indicating a read of the RFID tag by the RFID reader.

2. The system of claim 1, wherein the plurality of sensors comprise at least two photoelectric sensors, wherein a first photoelectric sensor is positioned at a distance away from the outbound door, wherein a second photoelectric sensor is positioned at a smaller distance away from the outbound door, wherein the RFID reader is located between the first photoelectric sensor and the second photoelectric sensor, and wherein the respective second signals indicate that the item retainer has blocked the first photoelectric sensor and the second photoelectric sensor at least in part at a same time.

3. The system of claim 1, wherein the log is generated based at least in part on a read event that is received from the RFID reader and that comprises a unique identifier of the item retainer read from the RFID tag, and wherein the computer system is further configured to track whether the item retainer was properly delivered to the delivery vehicle based at least in part on the log, wherein the log identifies the item retainer based at least in part on the unique identifier.

4. The system of claim 3, wherein the computer system is further configured to activate a set of lights located in proximity of the outbound door based at least in part on whether the item retainer was properly delivered, and wherein tracking whether the item retainer was properly delivered comprises:
  accessing a first identifier of an expected outbound door associated with the unique identifier of the item retainer;
  determining a match between the first identifier and a second identifier of the outbound door associated with the RFID reader;
  determining that the item retainer was properly delivered based at least in part on the match; and
  generating a delivery state that indicates a proper delivery, wherein the delivery state is included in the log.

5. A computer-implemented method, comprising:
  receiving, by a computer system, one or more signals from one or more devices, wherein:
  the one or more devices comprise a first device and second device that are located in proximity of a radio frequency identification (RFID) reader, the RFID reader associated with a space opening and covering a read zone around the space opening,
  the one or more signals comprise a first signal from the first device and a second signal from the second device, the first signal indicating a state of the space opening, the second signal indicating a proximity of an item retainer to the read zone;
  determining that a condition to activate the RFID reader is met based at least in part on the first signal and the second signal;
  activating, by the computer system, the RFID reader based at least in part on the condition being met; and
  determining, by the computer system, a progress of the item retainer through the space opening based at least in part on whether an RFID tag was read by the RFID reader while the RFID reader was activated.

6. The computer-implemented method of claim 5, wherein the space opening comprises an outbound door of a storage facility, wherein the RFID tag is attached with the item retainer, wherein the item retainer retains items available from the storage facility, wherein the first device comprises a door sensor associated with the outbound, wherein the first signal indicates that the outbound door is in an open position, and wherein the second signal indicates that the item retainer has an outbound motion.

7. The computer-implemented method of claim 6, wherein the item retainer is destined to a delivery vehicle through the outbound door, and further comprising:
  activating, by the computer system, a visual indicator based at least in part on the progress of the item retainer through the space opening;
  tracking, by the computer system, a delivery of the item retainer to the delivery vehicle based at least in part on the progress; and
  updating, by the computer system, a log storing read events of the RFID tag.

8. The computer-implemented method of claim 5, wherein the computer system determines that the RFID tag was read based at least in part on a receipt of a read event from the RFID reader, wherein the read event comprises a unique identifier of the item retainer, and wherein determining the progress of the item retainer comprises:
  accessing a first identifier of an expected space opening based at least in part on the unique identifier; and
  determining the progress based at least in part on a comparison of the first identifier to a second identifier of the space opening associated with the RFID reader.

9. The computer-implemented method of claim 8, wherein the progress indicates that the item retainer properly progressed through the space opening based at least in part on a match between the first identifier and the second identifier, and further comprises updating a log about the item retainer properly progressing through the space opening.

10. The computer-implemented method of claim 8, wherein the progress indicates that the item retainer improperly progressed through the space opening based at least in part on a mismatch between the first identifier and the second identifier, and further comprising updating a log about the item retainer improperly progressing through the space opening and activating an alert about the progress.

11. The computer-implemented method of claim 5, wherein the computer system determines that the RFID tag was not read based at least in part on not receiving a read event that identifies the item retainer from the RFID reader while the RFID reader was activated, and wherein the progress is determined based at least in part on a receipt of the read event from another RFID reader.

12. The computer-implemented method of claim 5, further comprising:
  receiving a read event from the RFID reader based at least in part on the RFID reader being active, the read event identifying another item retainer;
  accessing a log about a delivery of the other item retainer, the log indicating that the other item retainer was previously delivered; and
  filtering the read event based at least in part on the log.

13. The computer-implemented method of claim 5, further comprising:
  receiving a read event from the RFID reader based at least in part on the RFID reader being active, the read event identifying another item retainer;
  determining that the RFID tag is stationary based at least in part on the read event; and
  filtering the read event based at least in part on the RFID tag being stationary.

14. A non-transitory computer-readable storage medium comprising instructions that, upon execution by a processor of a system, cause the system to perform operations comprising:
  receiving a first signal from a first device located in proximity to a radio frequency identification (RFID) reader, the RFID reader associated with a space opening and covering a read zone around the space opening, the first signal indicating a state of the space opening;
  receiving a second signal from a second device located in proximity to the RFID reader, the second signal indicating a proximity of an item retainer to the read zone of the RFID reader;

determining that a condition to activate the RFID reader is met based at least in part on the first signal and the second signal;

activating the RFID reader based at least in part on the condition being met;

receiving a read event generated by the RFID reader based at least in part on the RFID reader being activated, the read event corresponding to a read of an RFID tag associated with the item retainer; and determining a progress of the item retainer through the space opening based at least in part on the read event.

15. The non-transitory computer-readable storage medium of claim 14, wherein the operations further comprise: deactivating the RFID reader based at least in part on one or more of: a predetermined amount of time or a receipt of another signal from the first device, wherein the other signal changes the state of the space opening.

16. The non-transitory computer-readable storage medium of claim 14, wherein the space opening comprises an outbound door of a storage facility, wherein the first device and the second device are located on one side of the outbound door, wherein the item retainer is destined to a delivery vehicle located at an opposite side of the outbound door, and wherein the RFID reader comprises a plurality of antennas at least partially oriented towards the delivery vehicle.

17. The non-transitory computer-readable storage medium of claim 14, wherein the read zone covers a volume in space, wherein the item retainer progresses below a particular height through the volume, and wherein the second device is located at least one of within the volume or below the particular height.

18. The non-transitory computer-readable storage medium of claim 14, wherein the item retainer retains at least one item, wherein another RFID tag is associated with the at least one item, wherein the read event identifies the item retainer and the at least one item, and wherein the operations further comprise: cross-checking whether the at least one item is intended for the item retainer based at least in part on the read event and a log of items retained by the item retainer.

19. The non-transitory computer-readable storage medium of claim 14, wherein the operations further comprise:

receiving a second read event generated by the RFID reader based at least in part on the RFID reader being activated, the second read event corresponding to a read of a second RFID tag associated with an item and identifying the item;

identifying that the item is retained by a second item retainer based at least in part on an identifier of the item in a log of the second item retainer; and determining a second progress of the second item retainer through the space opening based at least in part on the second read event.

20. The non-transitory computer-readable storage medium of claim 14, wherein the read event further identifies at least one of: a carrier of the item retainer or an operator of the carrier, and wherein the operations further comprise tracking performance of the at least one of the carrier or the operator based at least in part on the read event and the progress of the item retainer.

\* \* \* \* \*